United States Patent [19]

Loyer

[11] 4,135,869
[45] Jan. 23, 1979

[54] APPARATUS FOR PRODUCING A CONTINUOUS FLEXIBLE TUBULAR CONDUIT

[75] Inventor: Philip K. Loyer, Waynesville, N.C.

[73] Assignee: Dayco Corporation, Dayton, Ohio

[21] Appl. No.: 857,739

[22] Filed: Dec. 5, 1977

[51] Int. Cl.² ........................................... B29D 23/05
[52] U.S. Cl. ............................... 425/71; 264/173;
425/112; 425/114; 425/376 B; 425/404
[58] Field of Search ................ 156/425, 430, 432;
72/66, 134, 135, 145, 146; 138/131, 132;
425/71, 113, 114, 112, 404, 445, 145, 376 B,
324.1; 264/174, 173

[56] References Cited
U.S. PATENT DOCUMENTS 2,791,803  5/1957  Henning ............................ 425/114
3,725,178  4/1973  Kleykamp et al. ............. 425/113 X
3,823,590  7/1974  Lang .................................... 72/66
3,989,431  11/1976  Martens ............................ 425/112

Primary Examiner—Richard B. Lazarus
Assistant Examiner—Mark Rosenbaum
Attorney, Agent, or Firm—Reuben Wolk

[57] ABSTRACT

Apparatus for producing a continuous flexible tubular conduit having a plurality of helically wound reinforcing-electrical wires is provided wherein the apparatus has means for forming a plurality of wires into a corresponding plurality of substantially identical continuous non-rotating helical coils without entanglement of such wires and an extruder head for extruding a polymeric tube around the coils with the coil turns coaxially aligned and alternately arranged to complete the tubular conduit.

16 Claims, 3 Drawing Figures

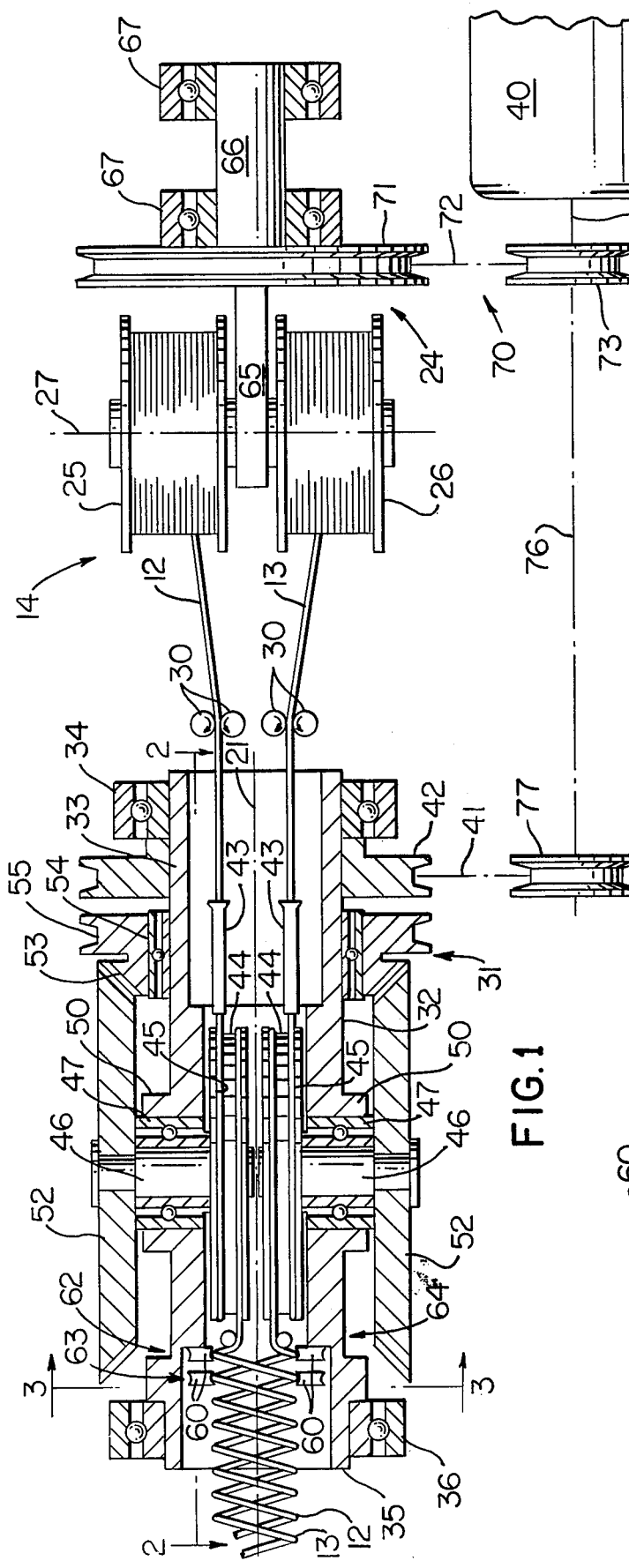

APPARATUS FOR PRODUCING A CONTINUOUS FLEXIBLE TUBULAR CONDUIT

BACKGROUND OF THE INVENTION

U.S. Pat. Nos. 3,724,507, 3,725,178, 3,779,846, and 3,802,991, for example, illustrate apparatus and methods for producing flexible conduits which have a single supporting helical wire provided as an integral part thereof. However, there are numerous applications where it is desirable to have a tubular flexible conduit provided with a plurality of reinforcing-electrical wires extending therealong. These patents also indicate that modifications may be made in their teachings to provide flexible conduits having a plurality of helical wires. However, none of these patents teaches or suggests specific apparatus and method steps which may be used to produce a flexible conduit having a plurality of helically coiled wires extending therealong and it will be appreciated that serious problems must be solved when a plurality of wires are used in such a conduit to prevent tangling of such wires during processing.

SUMMARY

It is a feature of this invention to provide apparatus for producing a continuous flexible tubular conduit having a plurality of helically wound reinforcing-electrical wires.

Another feature of this invention is to provide apparatus for producing conduit of the character mentioned including means assuring the plurality of wires are processed tangle free.

Another feature of this invention is to provide an improved method for producing conduit of the character mentioned.

Accordingly, it is an object of this invention to provide improved apparatus and method for producing continuous flexible tubular conduit of the character mentioned having one or more of the novel features set forth above or hereinafter shown or described.

Other details, features, objects, uses and advantages of this invention will become apparent from the embodiment thereof presented in the following specification, claims, and drawing. BRIEF DESCRIPTION OF THE DRAWING The accompanying drawing shows present preferred embodiments of this invention, in which FIG. 1 is a view with parts in cross section, parts in elevation, and parts broken away particularly illustrating wire forming means employed in the apparatus and method of this invention;

FIG. 2 is a view taken roughly on the line 2—2 of FIG. 1 and also illustrating other components downstream of the wire forming means which cooperate with such wire forming means while illustrating parts of the apparatus and method in elevation, parts in cross section, parts broken away, and parts shown schematically; and FIG. 3 is a view taken essentially on the line 3—3 of FIG. 1.

DESCRIPTION OF ILLUSTRATED EMBODIMENT

Reference is now made to FIG. 2 of the drawing which illustrates one exemplary embodiment of the apparatus and method of this invention which is designated generally by the reference numeral 10. The apparatus and method 10 is particularly adapted to produce a continuous flexible tubular conduit which is designated generally by the reference numeral 11 which has a plurality of helically wound reinforcing-electrical wires 12 and 13. The wires 12 and 13 serve the dual purpose of reinforcing the conduit (preventing the conduit from collapsing upon subjecting the same to a vacuum pressure, for example) while serving as electrical leads for operating electrical devices used in association with the conduit 11, such as in vacuum cleaner applications, and as is known in the art.

The apparatus 10 has wire forming means indicated generally by the reference numeral 14 (FIG. 1), and which will be described in more detail subsequently, for forming the plurality of wires 12 and 13 into a corresponding plurality of substantially identical continuous non-rotating helical coils which for convenience and ease of presentation are also designated by the reference numerals 12 and 13. The apparatus 10 also has an extruder 15 which includes an extruder head 16 having opening means 17 therethrough for receiving the coils 12 and 13 and such apparatus has means 20 for moving the coils 12 and 13 with the coil turns thereof coaxially aligned and alternately arranged through the opening means or opening 17. The moving means 20 will be described in more detail subsequently and feeds the coils 12 and 13 in a rectilinear path 21 substantially coinciding with the coaxial arrangement or common central axis of coils 12 and 13.

The extrusion apparatus 15 also has means 22 in its extruder head 16 of known construction for extruding a polymeric tube 23 around the coils 12 and 13 with the tube 23 shrinking in position upon cooling thereof and simultaneously adhering against the coils 12 and 13 to bond the sleeve 23 against such coils and thereby define the conduit 11. The extrusion apparatus is similar to the apparatus disclosed in the above-mentioned U.S. Pat. No. 3,725,178 the disclosure of which is incorporated herein by reference. Further, the vacuum means disclosed in this patent may also be added to the apparatus of this invention, if desired.

The wire forming means 14 comprises a rotatable support assembly 24 supporting a plurality of two wire feed spools 25 and 26 (which carry respective wires 12 and 13) with their axes in parallel relation and preferably with their axes in coaxial alignment on a common axis 27 and the axis 27 is disposed perpendicular to the rectilinear path 21. Further details of the support assembly 24 and associated structure which enables forming of the wires 12 and 13 into non-rotating helical coils also designated 12 and 13 will be described in detail subsequently.

Forming apparatus 14 (FIG. 1) includes a pair of rollers 30 associated with each wire 12 and 13 and each pair of rollers 30 forms a nip which receives an associated wire before the wire enters a device 31 of the forming apparatus 14. Each pair of rollers 30 prevents twisting of its associated wire between its supply roll and rollers 30. The device 31 includes a rotatable member 32 having a tubular inlet portion 33 supported by an anti-friction bearing such as a ball bearing assembly 34 and a coaxially aligned tubular outlet portion 35 supported by an anti-friction bearing or ball bearing assembly 36. The member 32 rotates about a central axis therethrough which coincides with the axis of the tubular portions 33 and 35 and in this example such central axis also substantially coincides with the rectilinear path 21. The member 32 is driven by a variable speed motor 40 (FIGS. 1 and 2) through a driving belt 41 directed around a pulley 42 detachably fixed to the tubular inlet portion 33 of the member 32. The motor 40 serves the dual purpose of rotating member 32 as well as the rotatable support assembly 24 as will be described in detail subsequently.

Each wire 12 and 13 is directed from its anti-twist rollers 30 through an associated curved guide tube 43 and is then directed around an associated feed wheel 44 which is rotatably carried by the member 32. Each wheel has an associated peripheral recess 45 which receives an associated wire either 12 or 13. Each wheel 44 is fixed on an end portion of an associated shaft 46 which is rotatably supported by an associated ball bearing assembly 47. Each bearing assembly 47 is retained within an associated one of a pair of hub portions 50 of the member 32 whereby each shaft 46 and feed wheel 44 is rotatably supported by a bearing assembly 47.

The device 31 also includes a pair of bevel gears 52 and each gear is fixed to the end portion of its associated shaft 46 opposite from a wheel 44.

Each bevel gear 52 meshes with another common bevel gear 53 of device 31 and gear 53 serves as a driving gear for the two gears 52 and is rotatably supported by an anti-friction bearing assembly 54 mounted on the inlet portion 33 of the member 32. A pulley 55 is fixed to the gear 53 and in this example pulley 55 is defined as an integral part of such gear and such pulley 55 and hence gear 53 is driven by a variable speed motor 56 (FIG. 2) through a driving belt 57. The device 31 has a plurality of rollers 58 disposed around the peripheries of the feed wheels 44 and such rollers 58 are rotatably supported on the base member 32. The rollers 58 have resilient outer surfaces and serve to retain the wires 12 and 13 within the recesses 45.

The device 31 (FIG. 3) also includes external wire forming rollers 60 and internal wire rollers 61. The external rollers 60 are in two sets 62 and 63 (FIG. 1) with each set having three external rollers 60 and one of the internal rollers 61. The external rollers 60 are disposed 120 degrees apart in each set and the rollers 61 are disposed 180 degrees apart with each roller 61 cooperating with a different set of external rollers.

With the above-described construction when the feed wheels 44 are rotated by the motor 56, each wire 12 and 13 is pulled or fed from its supply roll 25 and 26 respectively between its rollers 30 and through an associated curved guide tube 43. Each wire 12 and 13 is wrapped one turn around its feed wheel 44 and is directed from its wheel 44 between an associated set either 62 or 63 of rollers comprised of three external wire forming rollers 60 and an internal wire forming roller 61. In this example wire 12 is associated with set 62 and wire 13 with set 63. The rollers 60 and 61 of each set have circumferential grooves therein and are adjusted both radially and axially to form each wire associated therewith into axially spaced turns which make up an associated coil either 12 or 13. The forming rollers 60 and 61 are disposed so that after an associated wire is coiled and springs back slightly the outer diameter of the coil thus formed is slightly less than the inside diameter of the tubular outlet portion 35 of the member 32.

Each set 62 or 63 of external rollers 60 with its internal roller 61 cooperating with means rotating an associated feed wheel 44 about the axis of member 32 may be considered as means twisting an associated wire (either) 12 or 13 as it exits its feed wheel 44. The twisting means for each wire will be designated by the same general reference numeral 64 and indicated at only one location in FIG. 1.

As previously indicated the wire forming means 14 comprises the rotatable support assembly 24 and such assembly 24 includes a horizontally disposed beam 65 which is fixed to and extends in a cantilevered manner as an extension from a rotatable support shaft 66 which is supported by antifriction bearing means, shown as a pair of ball bearing assemblies 67 which are axially spaced apart along the shaft 66. The bearing assemblies 67 are carried by any suitable support structure known in the art.

The support assembly 24 also has rotating means designated generally by the reference numeral 70 for rotating support assembly 24 and feed spools 25 and 26 about an axis substantially coinciding with the rectilinear path 21 thereby assuring that during the forming of the wires 12 and 13 including twisting thereof about their longitudinal axes to define helical coils 12 and 13, the entire forming of coils 12 and 13 may be achieved free of entanglements of the wires by the twisting means.

The rotating means 70 comprises a wheel in the form of a sheave 71 which is fixed to the shaft 66 and beam 65 and is particularly adapted to be rotated by a drive belt 72 to provide simultaneous rotation of the beam 65, shaft 66, and spools 25 and 26. The belt 72 is driven by a sheave 73 which is fixed to a shaft 74 extending from the drive motor 40 previously mentioned. With this construction and arrangement rotation of the shaft 74 by the motor 40 provides rotation of the spools 25 and 26 and this rotation is synchronized or precisely correlated with the twisting of the wires 12 and 13 into helical coils as will now be described in detail.

The shaft 74 has an extension 76 outwardly of the sheave 73 and the extension 76 has a sheave 77 suitably fixed thereto for rotation therewith. The sheave 77 has the belt 41 disposed therearound which operatively engages the pulley 42 whereby the motor 40 drives or rotates both the member 32 about its axis coinciding with path 21 and the rotatable support assembly 24.

The apparatus 14 of this invention has means correlating the feeding of wires 12 and 13 from the respective spools 25 and 26 with the twisting means 64, rotating means 70, and moving means 20 and such means is in the form of a centrol device or controller 80 illustrated in FIG. 2. The control device 80 is shown schematically and controls the associated variable speed motors 40 and 56 using techniques and associated control components (not shown) as are known in the art to assure the forming of coils 12 and 13 is with precision and free of entanglements. The motors 40 and 56, feed wheels 44, and associated components are designed, adjusted, and correlated so that during each revolution of the member 32 sufficient wire 12 and 13 is fed by the wheels 44 to form a convolution or turn in the helical coils 12-13. As a result the coils 12 and 13 are continuously formed and fed through the outlet portion 35 without any rotation of such coils thus formed on their longitudinal axes.

As previously mentioned the apparatus 10 of this invention has moving means 20 (FIG. 2) and such moving means 20 comprises an elongated feed screw 81 which extends into the opening 17 in the extruder head 16 and the screw 81 has a plurality of two external helical grooves 82 and 83 with each groove 82 and 83 having a depth (not shown for ease of illustration) which is approximately the same as the diameter of an associated wire; and, in this example the wires 12 and 13 are of the same diameter whereby the grooves 82 and 83 are of the same depth. The helical grooves 82 and 83 are provided in the screw 81 so that the groove turns thereof are alternately arranged whereby the helical coils 12 and 13 have their turns correspondingly alternately arranged and aligned on a common axis coinciding with the rectilinear path 21.

The screw 81 is suitably rotatably supported within the extruder head 16 employing any suitable means known in the art and an example of the manner in which a similar screw is supported in position is illustrated in the above-mentioned U.S. Pat. No. 3,725,178. The screw 81 has an associated sheave or pulley assembly 85 operatively associated therewith and the assembly 85 has a sheave 86 which is operatively engaged and driven by a drive belt 87 which is in turn driven by a suitable drive sheave 88 which is in turn suitably driven by a variable speed motor 90. The motor 90 is suitably operatively connected to the control means or device 80. Thus the device 80 controls the moving means 20 which is comprised of feed screw 81 by controlling the rotation of such feed screw. As indicated earlier, the control device 80 assures that the feeding of wires 12 and 13 from their respective spools 25 and 26, the twisting thereof by twisting means 64, the rotation of the rotating means 70, and the motion imparted by moving means 20 is achieved with precision to enable feeding of the plurality of two helical coils 12 and 13 through the exturder head 16 free of entanglements and so that the polymeric tube 23 may be extruded therearound in the desired manner.

The polymeric tube 23 is extruded in the extruder head 16 as previously described and vacuum means may be employed as disclosed in the above-mentioned U.S. Pat. No. 3,725,178, and as mentioned earlier, by incorporating suitable means in the extruder head 16 causing vacuum urging of tube 23 against coils 12-13 and the simultaneous formation of a positive bond between the tube and the wires defining the coils 12 and 13 while also providing helical convolutions in the tube 23 as is known in the art.

Polymeric material is provided by the extrusion apparatus 15 to the extruder head 16 at a feed rate which is sufficient to provide the desired thickness of the polymeric tube 23 with the desired convolutions therein. The polymeric material is fed by apparatus 15 using any suitable means such as a conventional feed screw (not shown) which may be driven by a feed screw drive motor 92.

The conduit 11 defined by extruding tube 23 around coils 12-13 is then moved out of head 16 through a cooling device 93 where such conduit is suitably cooled by either passing same through a water filled trough or cooled by cooling same with cooling water using a plurality of water spray nozzles 94. After the cooling of the conduit 11, and particularly hot extruded tube 23 thereof, the conduit is suitably dried by hot air nozzles 95 provided in drying device 96 disposed downstream of the cooling device 93.

The wires 12 and 13 may be coated with a suitable electrical insulating material which may be in the form of a coating a few (less than 5) mils thick. However, it will be appreciated that the wires may be provided with substantially thick electrical insulating sleeve members as is known in the art whereby such sleeve members may be of substantial thickness many times greater than the thickness of the electrical insulating coating.

The wires 12 and 13 disclosed herein may be made of any suitable material employed in the art which is capable of serving as an electrical conductor as well as serving to reinforce the associated conduit.

As indicated earlier polymeric material is employed to make the tube 23 and it will be appreciated that any suitable polymeric material may be employed for this purpose. For example, such polymeric material may be a suitable rubber compound, a snythetic plastic material, or the like. Preferably the polymeric material is in the form of a thermoplastic material.

The apparatus and method disclosed herein is directed to the manufacture of a flexible tubular conduit having a plurality of helically wound reinforcing-electrical wires which have a single tube of polymeric material disposed therearound. However, it will be appreciated that additional components, such as, additional extrusion apparatus; devices to provide further reinforcement to the conduit, such as, braiding machines; and the like may be added to the apparatus and method disclosed to define a conduit having a plurality of tubular layers disposed around the helically wound coils thereof as well as having further reinforcing means disposed against one or more of such tubular layers.

In this disclosure of the invention additional moving means have not been illustrated downstream of the drying device 96. However, it will be appreciated that any suitable means employed in the art may be used for this purpose including so-called caterpillar-type or opposed endless belt conveyors which grip diametrically opposed surfaces of the conduit 11 without significantly compressing same. The additional moving means provide movement of such conduit either to another station or to a suitable location where the conduit may be cut to length or wound on a suitable supply roll thereof as is known in the art.

In the exemplary apparatus and method disclosed in the drawing, the various components have been shown without detailed support structure therefor, and, this has been done for simplicity and ease of presentation and it is to be understood that suitable support structure could be provided as required and known in the art for the purpose of supporting the illustrated components.

While present exemplary embodiments of this invention, and methods of practicing the same, have been illustrated and described, it will be recognized that this invention may be otherwise variously embodied and practiced within the scope of the following claims.

What is claimed is:

1. Apparatus for producing a continuous flexible tubular conduit having a plurality of helically wound reinforcing-electrical wires comprising; means for forming said wires into a corresponding plurality of substantially identical continuous non-rotating helical coils; an extruder head having an opening for receiving said coils therethrough; means extending into said opening for moving said coils through said opening with the coil turns of said coils coaxially aligned and alternately arranged; said moving means moving said coils in a rectilinear path substantially coinciding with said coaxial alignment; and means in said head for extruding a polymeric tube around said coils to define said conduit; said wire forming means comprising, a support assembly rotatably supporting a plurality of wire feed spools with their axes perpendicular to said rectilinear path, a plurality of feed wheels each having a peripheral recess therein for receiving an associated wire, means twisting said wires as they exit said feed wheels, means rotating said support assembly and feed spools about an axis substantially coinciding with said rectilinear path to assure said wires are free of entanglements during twisting thereof by said twisting means, and control means correlating the feeding of wires from said spools with said twisting means, rotating means, and moving means.

2. Apparatus as set forth in claim 1 in which said forming means comprises a pair of rollers associated with each of said plurality of wires wherein each of said pair of rollers forms a nip which receives a wire from an associated spool and prevents twisting thereof.

3. Apparatus as set forth in claim 1 in which said support assembly comprises a horizontally disposed rotatable support shaft having a horizontally disposed beam supported in a cantilevered manner from the terminal end thereof, said plurality of spools being supported on said beam perpendicular to said rectilinear path.

4. Apparatus as set forth in claim 3 in which said rotating means comprises a wheel in the form of a sheave which is fixed to said shaft and beam and a drive belt for rotating said sheave, shaft, and beam.

5. Apparatus as set forth in claim 4 in which said moving means comprises an elongated feed screw which extends into said opening, said feed screw having a plurality of helical grooves therein in which the groove turns thereof are alternately arranged and said helical coils are disposed in said grooves with their turns correspondingly alternately arranged.

6. Apparatus as set forth in claim 5 in which said moving means further comprises a sheave detachably fixed to said screw and a drive belt for rotating said sheave and screw.

7. Apparatus as set forth in claim 4 and further comprising a common drive operatively associated with and rotating said rotating means and moving means.

8. Apparatus as set forth in claim 7 in which said common drive is an electric motor.

9. Apparatus as set forth in claim 3 in which said rotating means comprises a first sheave fixed to said shaft and beam and a first drive belt for rotating said first sheave; said moving means comprises, an elongated feed screw which extends into said opening, said feed screw having a plurality of helical grooves therein in which the groove turns thereof are alternately arranged and said helical coils are disposed in said grooves with their turns correspondingly alternately arranged, a second sheave detachably fixed to said feed screw, and a second drive belt for rotating said second sheave and feed screw; and said apparatus further comprises; a drive motor having a rotatable shaft extending therefrom; a third sheave fixed at one position along said shaft, an extension in said shaft extending outwardly of said third sheave, a fourth sheave fixed on said extension, said third sheave having said first drive belt operatively associated therewith and said fourth sheave having said second drive belt operatively associated therewith.

10. Apparatus as set forth in claim 9 in which said drive belts are in the form of V-belts.

11. Apparatus as set forth in claim 9 in which said twisting means comprises a plurality of external wire-forming rollers and at least one internal wire-forming roller associated with each of said plurality of wires as each of said wires exits its associated feed wheel.

12. Apparatus as set forth in claim 11 and further comprising a plurality of retainer rollers for retaining said wires within the peripheral recesses of said feed wheels.

13. Apparatus as set forth in claim 12 in which each of said retainer rollers has a resilient outer surface.

14. Apparatus as set forth in claim 9 and further comprising means for cooling said polymeric tube and hence said conduit after movement thereof out of said extruder head.

15. Apparatus as set forth in claim 14 in which said cooling means comprises a plurality of spray nozzles of cooling water.

16. Apparatus as set forth in claim 14 and further comprising means for drying said conduit downstream of said cooling means.

* * * * *